（12）United States Patent
Kanamarlapudi et al.

(10) Patent No.: US 12,132,576 B2
(45) Date of Patent: *Oct. 29, 2024

(54) HARQ RETRANSMISSION TERMINATION BASED ON LOST REDUNDANCY VERSION

(71) Applicant: QUALCOMM Incorporated, San Diego, CA (US)

(72) Inventors: Sitaramanjaneyulu Kanamarlapudi, San Diego, CA (US); Hobin Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,055

(22) Filed: Jul. 10, 2023

(65) Prior Publication Data

US 2024/0007227 A1    Jan. 4, 2024

Related U.S. Application Data

(63) Continuation of application No. 17/242,852, filed on Apr. 28, 2021, now Pat. No. 11,711,170.

(Continued)

(51) Int. Cl.
*H04L 1/1812* (2023.01)
*H04L 5/00* (2006.01)

(52) U.S. Cl.
CPC .......... *H04L 1/1812* (2013.01); *H04L 5/0055* (2013.01)

(58) Field of Classification Search
CPC ... H04W 28/04; H04W 72/04; H04W 72/042; H04W 88/08; H04L 5/0007; H04L 1/1812; H04L 5/0055

(Continued)

(56) References Cited

U.S. PATENT DOCUMENTS 8,265,023 B2 * 9/2012 Wang ................. H04L 1/1819
                                                            455/452.2
8,429,481 B2    4/2013 Lohr et al.
(Continued)

FOREIGN PATENT DOCUMENTS

EP    1 317 811 B1 * 11/2006 ............... H04L 1/18
EP    2 265 077 A1 * 12/2010 ............ H04W 72/12
(Continued)

OTHER PUBLICATIONS

International Preliminary Report on Patentability—PCT/US2021/029891—The International Bureau of WIPO—Geneva, Switzerland—Nov. 10, 2022.

(Continued)

*Primary Examiner* — Peter G Solinsky
*Assistant Examiner* — Sanjay K Dewan
(74) *Attorney, Agent, or Firm* — Procopio, Cory, Hargreaves & Savitch LLP

(57) ABSTRACT

This disclosure provides systems, devices, apparatus and methods, including computer programs encoded on storage media, for terminating HARQ retransmissions. A wireless receiver may determine that a transmission of a first TB based on a first redundancy version is not received from a wireless transmitter. Based on the determination, the wireless receiver may transmit, to the wireless transmitter, a HARQ ACK to terminate one or more HARQ retransmissions associated with the different redundancy versions of the first TB.

20 Claims, 10 Drawing Sheets

Related U.S. Application Data

(60) Provisional application No. 63/018,429, filed on Apr. 30, 2020.

(58) Field of Classification Search
USPC .......................................................... 370/329
See application file for complete search history.

(56) References Cited

U.S. PATENT DOCUMENTS

| | | | |
|---|---|---|---|
| 10,893,509 B2 | 1/2021 | Mallik et al. | |
| 11,632,198 B2* | 4/2023 | Zhou | H04L 5/0055 |
| | | | 370/329 |
| 11,652,600 B2* | 5/2023 | Xu | H04W 72/232 |
| | | | 370/329 |
| 11,777,661 B2* | 10/2023 | Babaei | H04W 72/23 |
| | | | 370/329 |
| 2008/0089281 A1 | 4/2008 | Yoon et al. | |
| 2009/0022098 A1 | 1/2009 | Novak et al. | |
| 2010/0080187 A1 | 4/2010 | Papasakellariou et al. | |
| 2011/0038302 A1* | 2/2011 | Papasakellariou | H04W 72/23 |
| | | | 370/315 |
| 2011/0103335 A1 | 5/2011 | Golitschek et al. | |
| 2011/0305213 A1* | 12/2011 | Lohr | H04L 1/1887 |
| | | | 370/328 |
| 2012/0051307 A1 | 3/2012 | Huang et al. | |
| 2012/0057545 A1* | 3/2012 | Hariharan | H04L 1/1685 |
| | | | 370/329 |
| 2012/0120927 A1 | 5/2012 | Bucknell et al. | |
| 2013/0242889 A1 | 9/2013 | Khoryaev et al. | |
| 2013/0339482 A1* | 12/2013 | Yoshimoto | H04L 1/004 |
| | | | 709/217 |
| 2014/0219206 A1* | 8/2014 | Han | H04L 5/0048 |
| | | | 370/329 |
| 2014/0355553 A1 | 12/2014 | Astely et al. | |
| 2015/0098432 A1* | 4/2015 | Han | H04B 7/0473 |
| | | | 370/329 |
| 2015/0103752 A1 | 4/2015 | Yu et al. | |
| 2015/0319776 A1 | 11/2015 | Seo et al. | |
| 2016/0036618 A1* | 2/2016 | Einhaus | H04L 1/0016 |
| | | | 370/329 |
| 2016/0095133 A1* | 3/2016 | Hwang | H04L 1/1887 |
| | | | 370/329 |
| 2016/0270038 A1* | 9/2016 | Papasakellariou | H04W 72/23 |
| 2017/0273056 A1* | 9/2017 | Papasakellariou | H04W 52/146 |
| 2018/0278370 A1* | 9/2018 | Jeong | H04L 1/0058 |
| 2019/0261354 A1 | 8/2019 | Fakoorian et al. | |
| 2019/0335471 A1* | 10/2019 | Kim | H04L 5/0053 |
| 2021/0105103 A1* | 4/2021 | Bhattad | H04L 1/1887 |
| 2021/0344447 A1* | 11/2021 | Kanamarlapudi | H04L 1/1812 |

FOREIGN PATENT DOCUMENTS

| | | | |
|---|---|---|---|
| GB | 250 75 29 A | * 11/2012 | ............... H04L 1/18 |
| WO | 2016130362 | 8/2016 | |
| WO | WO-2017193376 A1 | 11/2017 | |
| WO | 2019136632 A1 | 7/2019 | |

OTHER PUBLICATIONS

International Search Report and Written Opinion—PCT/US2021/029891—ISA/EPO—Jul. 22, 2021.

Chao H., et al., "Optimization of HARQ Parameters in TD-SCDMA HSDPA System", Wireless Signal Processing and Network Laboratory of Beijing University of Posts and Telecommunications, Beijing 100876, Jan. 10, 2008, 6 pages.

European Search Report—EP24150526—Search Authority—The Hague—Apr. 11, 2024.

* cited by examiner

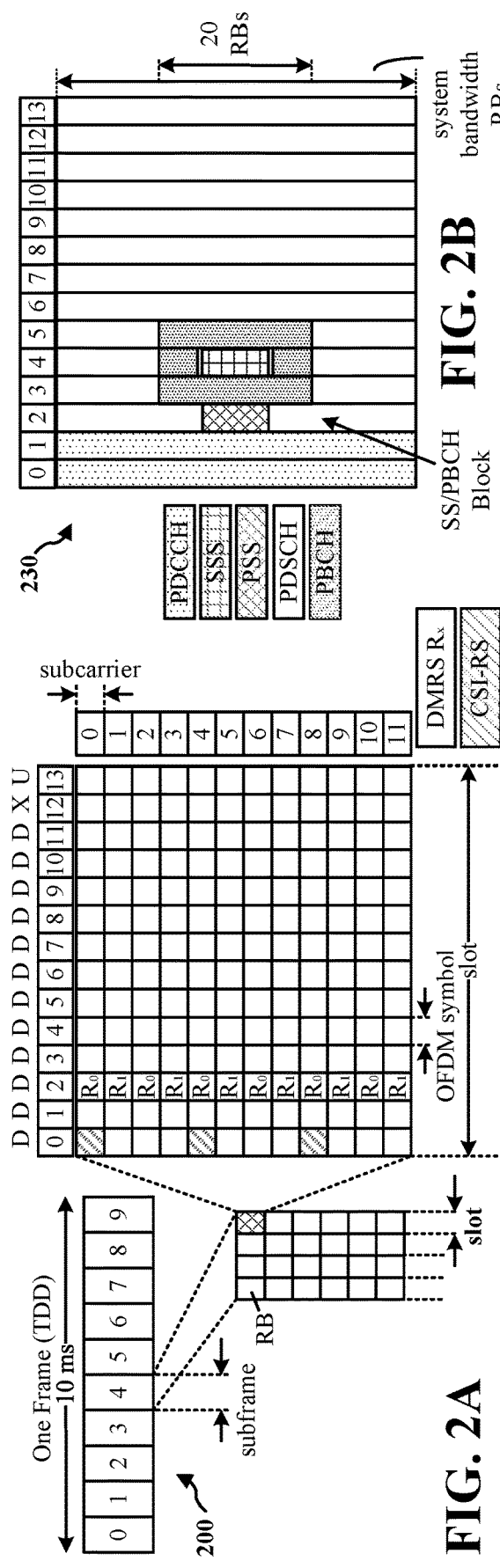
FIG. 2A
FIG. 2B
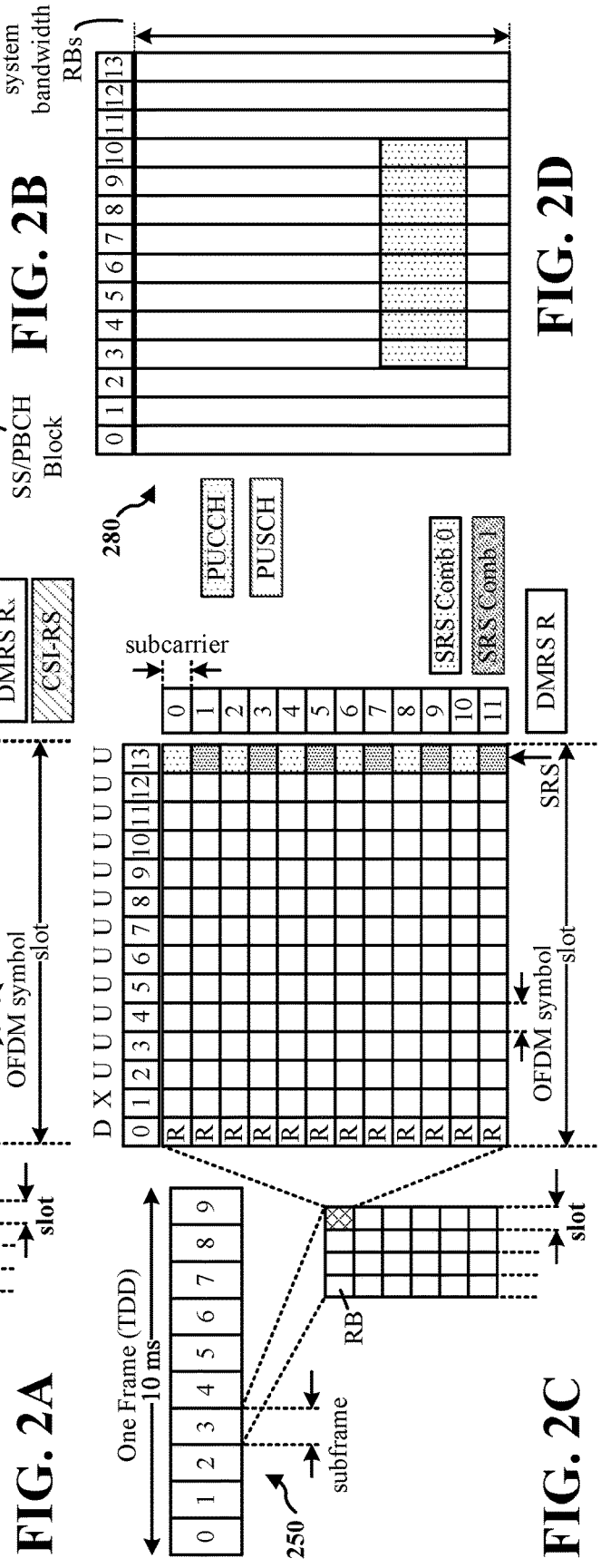
FIG. 2C
FIG. 2D

HARQ RETRANSMISSION TERMINATION BASED ON LOST REDUNDANCY VERSION

CROSS REFERENCE TO RELATED APPLICATION(S)

This application in a continuation of U.S. application Ser. No. 17/242,852, filed on Apr. 28, 2021, entitled "HARQ RETRANSMISSION TERMINATION BASED ON LOST REDUNDANCY VERSION," which claims the benefit of U.S. Provisional Application Ser. No. 63/018,429, entitled "HARQ REDUNDANCY VERSION DECODE" and filed on Apr. 30, 2020, which is expressly incorporated by reference herein in its entirety.

TECHNICAL FIELD

The present disclosure relates generally to communication systems, and more particularly, to hybrid automatic repeat request (HARQ) retransmission termination based on a lost redundancy version (RV).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In HARQ processes, an initial transmission associated with a first redundancy version of a transport block (TB) may be transmitted to a wireless receiver followed by one or more retransmissions associated with different redundancy versions of the same TB. For example, the first redundancy version may be RV 0 and the different redundancy versions may be RV 2, RV 3, and RV 1, respectively. In examples, a modulation and coding scheme (MC S) may be indicated to the wireless receiver via RV 0, such that the MCS may not be re-indicated to the wireless receiver via the one or more retransmissions associated with RV 2, RV 3, and RV 1. Instead, the different redundancy versions may be associated with a reserved MCS that corresponds to a same MCS as used for RV 0. However, if RV 0 is lost/undetermined by the wireless receiver, the reserved MCS corresponding to the MCS of RV 0 may not be determined to decode RV 2, RV 3, and RV 1. As a result, continuing to retransmit the one or more different redundancy versions to the wireless receiver may be a waste of resources when the one or more different redundancy versions cannot be decoded by the wireless receiver due to RV 0 being lost/undetermined.

The wireless receiver may be configured to transmit, to a wireless transmitter, a HARQ acknowledgement (ACK) when a HARQ transmission/retransmission is successfully received and decoded by the wireless receiver, and transmit a negative acknowledgement (NACK) when the HARQ transmission/retransmission is not successfully received and decoded by the wireless receiver. If the wireless transmitter does not receive an ACK or a NACK from the wireless receiver, the wireless transmitter may determine that discontinuous transmission (DTX) has occurred and proceed with retransmission of a next redundancy version (e.g., RV 2). Hence, if the wireless receiver is expecting to receive RV 0, but RV 0 is lost/not received, the wireless receiver may unexpectedly receive RV 2. An unexpected reception of RV 2 may indicate to the wireless receiver that RV 0 was lost, which may thereby cause the wireless receiver to transmit a forced ACK to the wireless transmitter. The forced ACK may terminate additional HARQ retransmissions associated with the remaining different redundancy versions of the TB to reduce wasted resources that may result from the wireless receiver not being able to decode the additional HARQ retransmissions associated with the remaining different redundancy versions of the TB.

In an aspect of the disclosure, a method, a computer-readable medium, and an apparatus are provided. The apparatus may determine that a transmission of a first TB based on a first redundancy version is not received from a wireless transmitter, and transmit, to the wireless transmitter, a HARQ ACK to terminate the one or more HARQ retransmissions associated with one or more different redundancy versions of the first TB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
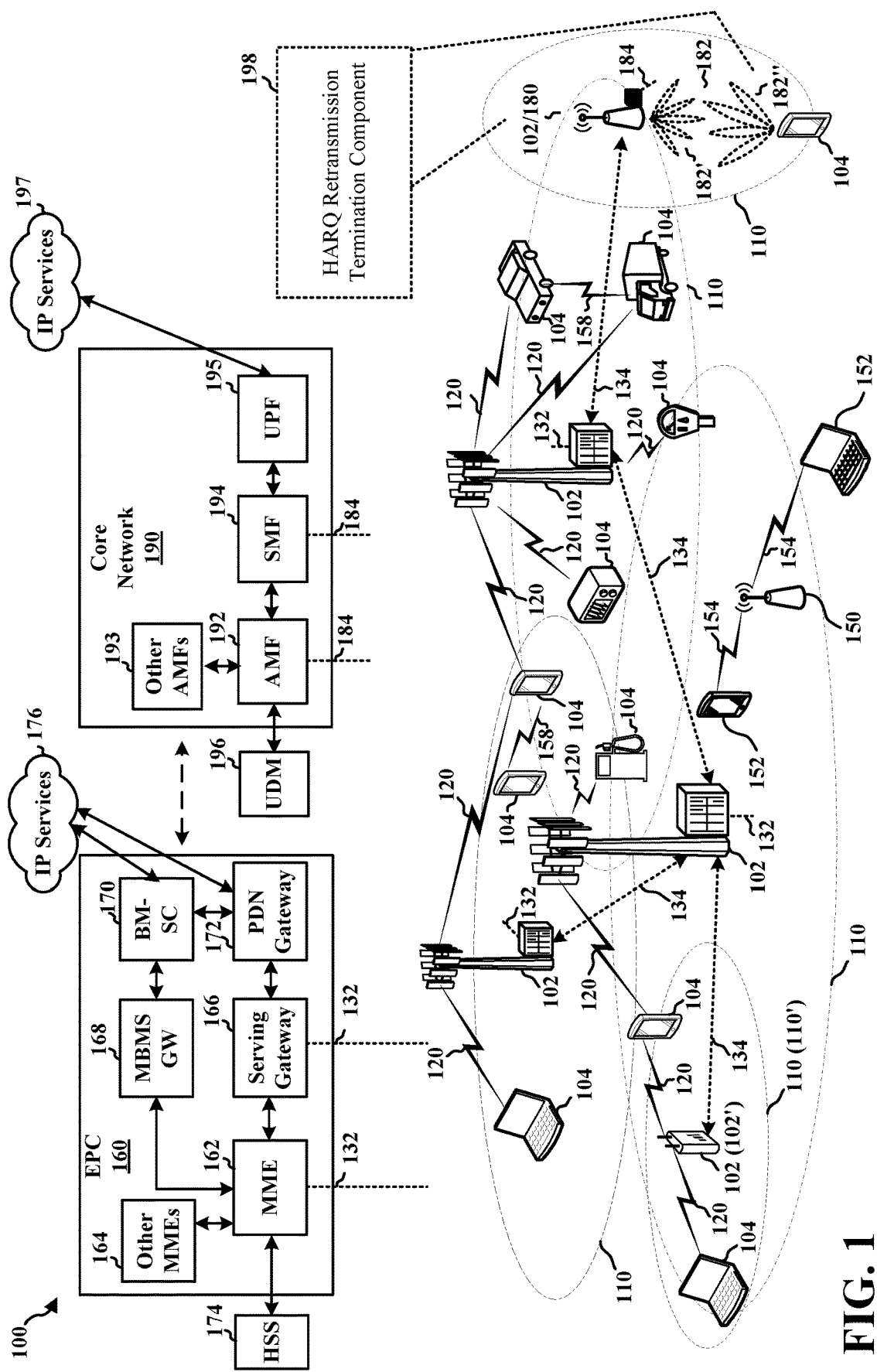
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the wireless receiver may include a hybrid automatic repeat request (HARQ) retransmission termination component 198 configured to determine that a transmission of a first transport block (TB) based on a first redundancy version (RV) is not received from a wireless transmitter; and transmit, to the wireless transmitter, a HARQ acknowledgment (ACK) to terminate one or more HARQ retransmissions associated with one or more different RVs of the first TB. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
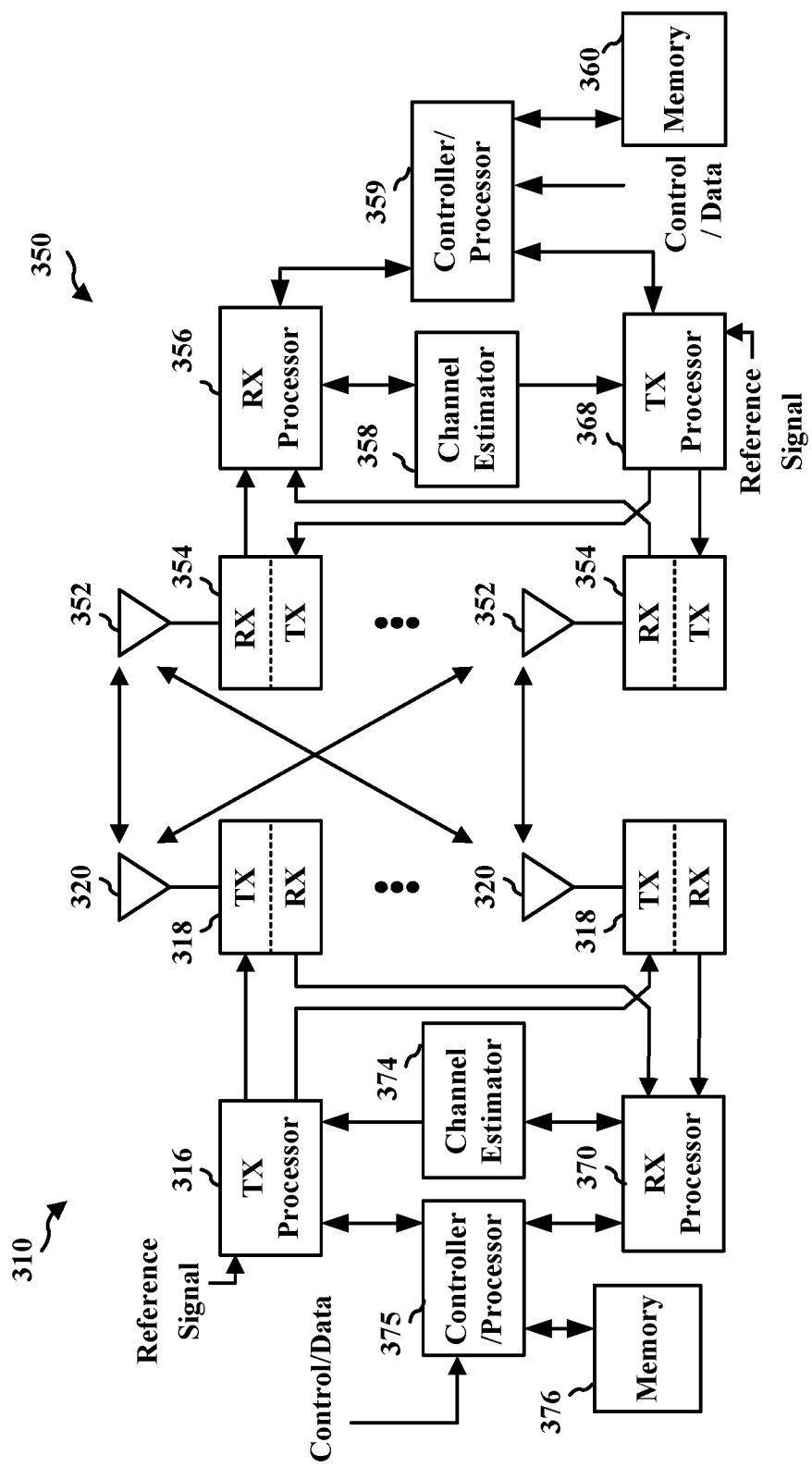
FIG. 3 is a diagram illustrating an example of a base station and a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the HARQ retransmission termination component 198 of FIG. 1.

At least one of the TX processor 316, the RX processor 370, and the controller/processor 375 may be configured to perform aspects in connection with the HARQ retransmission termination component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
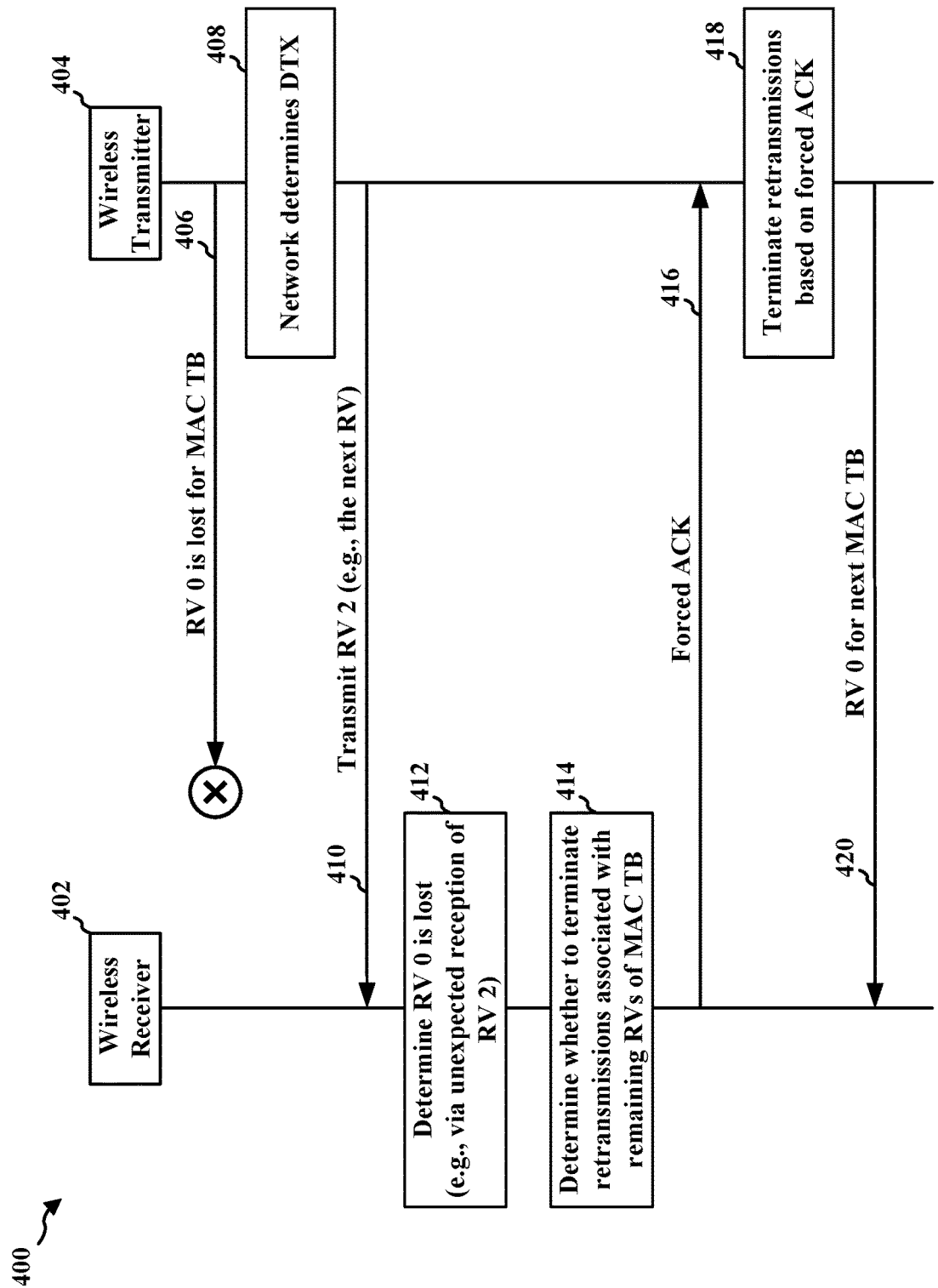
FIG. 4 is a call flow diagram illustrating communications between a wireless transmitter and a wireless receiver.

FIG. 4 is a call flow diagram 400 illustrating communications been a wireless transmitter 404 and a wireless receiver 402. In a first example, the wireless transmitter 404 may be a base station and the wireless receiver 402 may be a UE. In a second example, the wireless transmitter 404 may be a UE and the wireless receiver 402 may be a base station.

At 406, the wireless transmitter 404 may transmit a redundancy version (RV) 0 for a MAC TB 0 that may be lost/not received by the wireless receiver 402. At 408, the wireless transmitter 404 may determine that discontinuous transmission (DTX) has occurred based on the wireless transmitter 404 not receiving an ACK or a negative acknowledgement (NACK) in response to the transmission, at 406, associated with the RV 0 for the MAC TB 0. Accordingly, at 410, the wireless transmitter 404 may transmit RV 2 for MAC TB 0, which may be a next RV that follows RV 0. RV 2 may be received, at 410, by the wireless receiver 402.

At 412, the wireless receiver 402 may determine, based on receiving RV 2, that RV 0 for MAC TB 0 is lost. That is, RV 2 may be received, at 410, unexpectedly by the wireless receiver 402, which may have expected to receive RV 0 from the wireless transmitter 404. At 414, the wireless receiver 402 may determine whether to terminate retransmissions associated with remaining RVs of the MAC TB 0 (e.g., based on the determination, at 412, that the RV 0 is lost). The determination, at 414, of whether to terminate the retransmissions associated with the remaining RVs may be based on the wireless receiver 402 being unable to decode the remaining RVs as a result of non-received information included in the lost transmission of RV 0. For example, if a lost RV 0 transmission indicates HARQ decoding information (e.g., modulation and coding scheme (MCS) 20), and subsequent HARQ retransmissions, such as RV 2, RV 3, and/or RV 1, indicate reserved MCS (e.g., MCS 31), the wireless receiver 202 may be unable to decode the subsequent HARQ retransmissions based on the reserved MCS indicating that the wireless receiver 202 is to reuse the RV 0 information, which was lost, to decode the HARQ retransmissions. In another example, if the RV 0 transmission that indicates the HARQ decoding information is lost, but RV 2, RV 3, and/or RV 1, also includes complete HARQ decoding information (e.g., MCS, RB, RV, etc.), the wireless receiver 402 may be able to recover from the lost RV 0 transmission and proceed with decoding the subsequent HARQ retransmissions based on the complete HARQ decoding information also being included in RV 2, RV 3, and/or RV 1.

In cases where the wireless receiver 402 is able to recover from the lost RV 0 transmission and decode the subsequent HARQ retransmissions, the wireless receiver 402 may determine, at 414, not to terminate the retransmissions associated with the remaining RVs of the MAC TB, and may proceed with decoding the remaining RVs of the MAC TB. In cases where the wireless receiver 402 is unable to decode the subsequent HARQ retransmissions (e.g., based on the subsequent HARQ retransmissions including reserved MCS), the wireless receiver 402 may determine, at 414, to terminate the retransmissions associated with the remaining RVs of the MAC TB via a forced ACK. The forced ACK may indicate to the wireless transmitter 404 that additional HARQ retransmissions to the wireless receiver 402 are unnecessary, and that the wireless transmitter 404 may proceed with sending a next MAC TB. Since the wireless receiver 402 is unable to decode retransmissions based on reserved MCS when RV 0 is lost, termination of the subsequent retransmissions may prevent the wireless transmitter 404 from wasting time and frequency resources on sending the subsequent retransmissions to the wireless receiver 402, and may allow the wireless transmitter 404 to immediately proceed with sending the next MAC TB to the wireless receiver 402.

When the wireless receiver 402 determines, at 414, to terminate the retransmissions associated with the remaining RVs of the MAC TB, the wireless receiver 402 may transmit, at 416, the forced ACK to the wireless transmitter 404. At 418, the wireless transmitter 404 may terminate the retransmissions associated with the remaining RVs of MAC TB 0 based on reception, at 418, of the forced ACK from the wireless receiver 402. At 420, the wireless transmitter 404 may transmit to the wireless receiver 402 a different RV 0 that is associated with the next MAC TB (e.g., a MAC TB 1).

Figure 5:
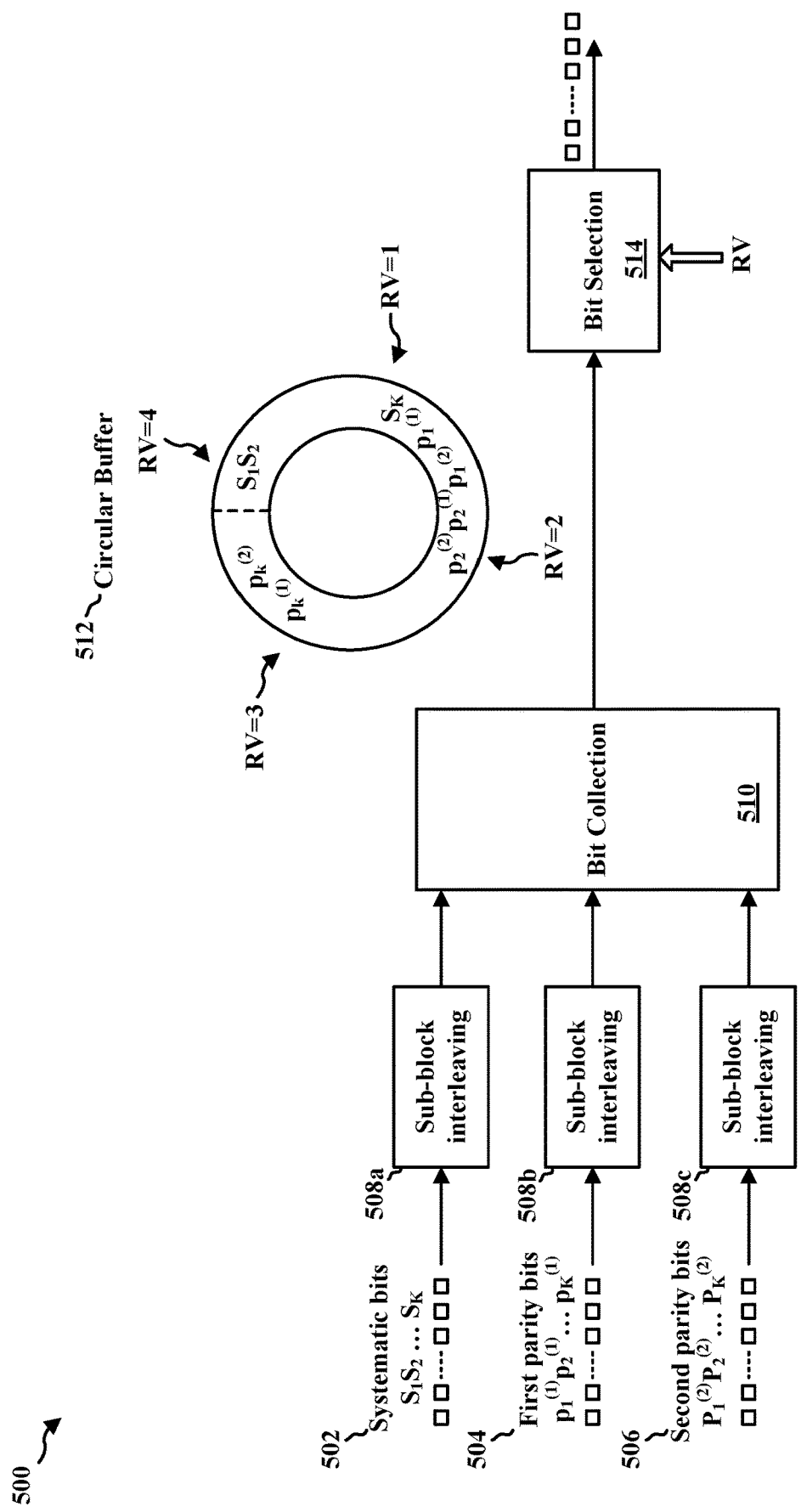
FIG. 5 illustrates a diagram corresponding to a channel encoding technique.

FIG. 5 is a diagram 500 corresponding to a channel encoding technique. For channel encoding in wireless communication, multiple logical procedures may be performed for TBs, segmentation, cyclic redundancy check (CRC) concatenation, etc. In examples, after symbols/bits are prepared for encoding, the bits may be provided for sub-block interleaving 508a-c, bit collection 510, and bit selection 514 (e.g., as an intermediate procedure of a physical layer procedure). A turbo encoder may execute logic to generate/output systematic bits 502 and parity bits 504-506 that may be subjected to forward error correction (FEC) mechanisms. The parity bits 504-506 may include first parity bits 504 and second parity bits 506.

The turbo encoder may output three separate streams of data for sub-block interleaving 508a-c. After the systematic bits 502 and the parity bits 504-506 are separately interleaved, the bits may be received by a circular buffer 512 based on first providing all the systematic bits 502 to the circular buffer 512 and then providing the first parity bits 504 and the second parity bits 506 to the circular buffer 512 in an alternating manner. For example, the systematic bits 502 may be first provided to the circular buffer 512 based on the scheme [S1, S2, . . . , Sk] followed by providing the parity bits 504-506 based on the scheme [P1(1), P1(2), P2(1), P2(2), . . . , Pk(1), Pk(2)], such that the parity bits 504-506 provided to the circular buffer 512 alternate between the first parity bits 504 and the second parity bits 506. Each of the three individually interleaved steams of data may be maintained in the circular buffer 512, from which the data may be retrieved for transmission.

A HARQ procedure may be used for packet transmission in the physical layer. More specifically, if a NACK is received in response to a packet transmission, the HARQ procedure may provide for more rapid retransmission of the packet in comparison to a level two retransmission. Repeated retransmission of a same packet may be referred to as chase combining. When a different pattern of bits is transmitted for decoding a previous symbol, the process may be referred to as incremental redundancy. For incremental redundancy, a PDSCH symbol may not be discarded based on unsuccessful decoding. The PDSCH symbol for a same HARQ bit may be preserved for superimposing the PDSCH symbol via FEC to recover the symbol. The circular buffer 512 may therefore provide increased performance with low implementation complexity.

The bit selection 514 may be used to extract consecutive bits from the circular buffer 512 to match a number of bits corresponding to resource blocks (RB) of a transmission. For example, when a PDSCH is scheduled, a certain number of RBs, bits, and/or modulation characteristics may be assigned to the PDSCH. The number of bits that may be included in a corresponding resource allocation may then be selected and transmitted from the circular buffer 512. An exact set of bits to be extracted for transmission may depend on a RV, which may further depend on different starting locations from the circular buffer 512. For instance, the bits selected from the circular buffer 512 may depend on the RV that is transmitted at that point of time (e.g., RV 0 and RV 1 may respectively start and end at different locations associated with the circular buffer 512).

In certain aspects, transmission of a TB may be based on four different RVs, which may correspond to RV 0, RV 1, RV 2, and RV 3. During transmission, an RV may be selected by a scheduler and provided to a receiver based on signaling or a predefined sequence. The transmitted RV may be configurable and/or dynamic. For example, the UE may execute a command for transmitting in UL, but in DL the base station may override the command even if the base station executes a similar technique as the UE. An example RV model may be associated with the sequence RV 0, RV 2, RV 3, RV 1 (e.g., in that order). After RV 1 is transmitted, there may be no further RVs for the TB, such that transmission of a next TB may be performed following RV 1. In aspects, the sequence for the RV model may be controlled by the network via DCI.

If RV 0 is received in DL and the UE does not successfully decode the associated code blocks/symbols, the UE may indicate a NACK to the network in UL. If RV 0 is lost/not decoded (e.g., a HARQ MAC TB 0 is transmitted but RV 0 is undetermined), the UE may not be able to decode other RVs that follow RV 0. That is, if RV 0 is not decoded in DL, for example, due to failed PDCCH decoding for which scheduling may not be determined or due to a tune-away, block error rate (BLER), connected-mode discontinuous reception (CDRX) configuration failures, etc., the UE may not indicate HARQ feedback in UL and the network may assume DTX. More specifically, if the UE does not provide an ACK or a NACK, DTX may be assumed by the network.

In aspects where the UE decodes the PDCCH but fails to decode the PDSCH, the PDSCH symbols may be preserved for recovery techniques. If the UE fails to recover the PDSCH symbols, the UE may transmit a NACK. For both cases of NACK/DTX, the network may retransmit the MAC TB using other redundancy versions (e.g., RV 2, RV 3, RV 1) in subsequent DL transmissions to enable HARQ level recovery at the receiver by increasing FEC opportunities.

If the UE completely misses RV 0 in the DL (e.g., RV 0 is lost), even with successful decoding of other RVs (e.g., RV 2, RV 3, RV 1), the UE may not be able to reliably decode the complete MAC TB due to systematic bits 502 in RV 0 being lost. Thus, even though RV 0 may be recovered in some cases, the UE may abort HARQ retransmission logic when RV 0 is determined to be lost based on configuration information. For example, continuing to decode/schedule subsequent HARQ retransmissions by the UE and the network may not be practical with respect to the MAC TB after RV 0 is lost. In addition, continuing to perform such procedures may result in wasted resources by subsequent retransmissions that reduce an overall capacity of the physical layer and/or cause delayed transmissions for subsequent data from the MAC in subsequent instances of the HARQ procedure.

Figure 6:
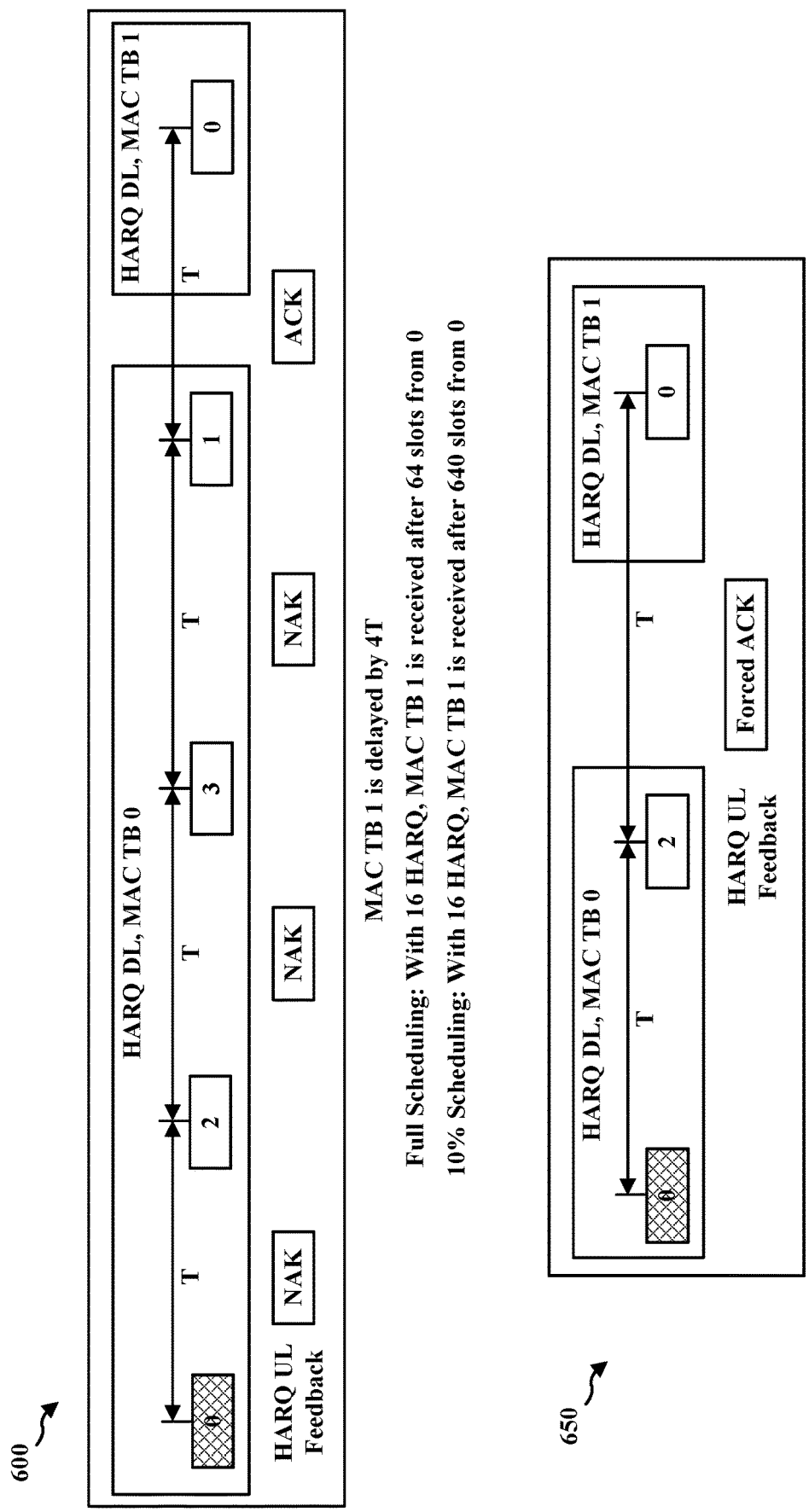
FIG. 6 illustrates diagrams associated with redundancy version (RV) decoding failures.

FIG. 6 includes diagrams 600-650 associated with RV 0 decoding failures. When the UE determines for a given HARQ that RV 0 is lost, the UE may abort a HARQ retransmission request by indicating a HARQ-ACK to the network. A forced HARQ-ACK may enable the network to proceed to a next HARQ procedure for transmission of a next MAC TB. In aspects, the next HARQ procedure may be performed while lost information for the previous HARQ is recovered through a radio link control (RLC) level automatic repeat request (ARQ), if the UE is configured with an RLC ARQ mode. The RLC may request retransmission of packets at the RLC level, which may reduce latency in comparison to waiting for the MAC to recover. For certain coding rates at the MAC TB level, the UE may be able to successfully recover. The UE may determine, based on the coding rate, physical characteristics and/or information indicated via DCI (e.g., MCS, RV instances, etc.), where the forced ACK may be provided to the network in the UL.

The forced HARQ-ACK may be transmitted when subsequent retransmissions, such as RV 2, RV 3, and RV 1, use a reserved MCS (e.g., when RV 0 is lost and the MCS is indicated by the network via the RV 0). That is, an MCS, such as MCS 15, may be indicated to the UE based on transmission of RV 0 and may not be re-indicated to the UE at a transmission time of RV 2, RV 3, or RV 1. Instead, subsequent RVs may be associated with the reserved MCS that corresponds to a same MCS as used for RV 0. However, if RV 0 is lost, the MCS may not be determined for decoding RV 2, RV 3, and RV 1. Thus, even if the UE were to successfully receive RV 2, RV 3, and/or RV 1, the UE may not have sufficient information to identify the MCS (e.g., as MCS 15 or some other MCS) for retransmission based on the failed decoding of RV 0. That is, if the network is using the same MCS in the subsequent retransmissions, the network may not indicate the MCS to the UE a second time for the retransmissions (e.g., the network may utilize a 0 value). In an example where MCS 15 is indicated via RV 0, a next retransmission may not indicate that MCS 15 was associated with RV 0. As such, decoding errors for the initial transmission corresponding to RV 0 may preclude the UE from being able to decode the remaining RVs.

Even when successful retransmissions of RV 2, RV 3, and RV 1 are associated with a determined MCS, the UE may not be able to decode the retransmissions as a result of the coding rates. For example, an initial transmission may indicate MCS 15 and the retransmissions may indicate a different MCS (e.g., MCS 10 or MCS 8), such that the retransmissions include a determined MCS. In such cases, there may not be a sufficient number of parity bits to perform the decoding, as the number of bits corresponding to the different MCS is reduced. Thus, in some aspects, successful decoding may depend on the code rate. A low coding rate may provide an increased likelihood of successful decoding based on an increased number of parity bits, and a high coding rate may provide a decreased likelihood of successful decoding based on a decreased number of parity bits. High coding rates and additional delay may be avoided when the UE is operating at or near a peak operating rate.

A lower coding rate may correspond to more redundancy bits in the channel coding process and a higher coding rate may correspond to less redundancy bits in the channel coding process. In an example based on 16 HARQs, excessive retransmissions may delay a next transmission. For full scheduling, which may assume every slot is scheduled consecutively, the next transmission/next MAC TB may be delayed by 32 slots (e.g., 16 HARQs×2 wasted/excessive retransmissions). For sparse scheduling, 10 percent of the scheduling may be allocated to the UE, where the next transmission/next MAC TB may be delayed by 320 slots (e.g., 16 HARQs×2 wasted/excessive retransmissions spaced at 1 slot for every 10 slots).

A Layer 2 logic may be improved based on reducing a time for receiving a next MAC TB. Given that the HARQ procedure may be abruptly concluded in some cases, a prompt indication to the RLC that an RLC packet data unit (PDU) is lost may decrease latency for the ARQ mechanism or other fast NACK mechanisms. Some configuration may pause for a previous HARQ to complete before triggering the retransmissions. Hence, an amount of time that memory buffers are maintained at the MAC level may be reduced, which may improve aspects associated with memory management.

In the diagram 600, the HARQ RV 0 is lost and a first NACK is transmitted based on the lost HARQ RV 0. Subsequently, RV 2 is received, unsuccessfully decoded, and a second NACK is transmitted. The process is repeated for RV 3 and RV 1 until an end of MAC TB 0 is reached and an ACK/NACK is transmitted for initiation of MAC TB 1. In configurations, after the initial transmission and the three retransmissions, the network may stop the retransmission process and proceed with a next transmission of a next MAC TB (e.g., MAC TB 1). The UE may determine that the next transmission corresponds to the next MAC TB based on a new data indicator (NDI) bit, which may be toggled between TB 0 and TB 1. In other configurations, eight retransmissions may be performed before the next MAC TB is transmitted based on toggling the NDI bit.

In the diagram 600, the MAC TB 1 is delayed by 4T, where T is a time interval between transmission/retransmissions. Even though the UE may determine that RV 0 is lost, a time delay of 4T may still occur before the next TB (e.g., MAC TB 1) is transmitted. The network may assume DTX when RV 0 is lost since no ACK/NACK is received from the UE. However, if RV 2 is received by the UE, but is not expected by the UE, there may be no need to perform the retransmissions of RV 3 and RV 1, since the UE may be unable to decode RV 3 and RV 1. Instead, as illustrated in the diagram 650, the UE may transmit a forced ACK to the network so that transmission/reception of the next MAC TB may be performed without any further delay from the remaining retransmissions of MAC TB 0. A delay between a time that RV 0 is lost and a time that MAC TB 1 is received in the diagram 650 may be reduced to 2T. In further aspects, if one or more other RVs of the HARQ is to be received before RV 0 is to be received, the forced ACK may not be transmitted until after the time at which RV 0 is expected (e.g., after RV 0 is lost).

While the diagrams 600-650 illustrate a delay for 1 HARQ process, in configurations there may be 16 HARQ processes performed at the physical layer within the MAC. Thus, if HARQs 0-15 are preformed one after the other, there may be a large cumulative time delay (e.g., based on wasted resources/excessive retransmissions). For example, each retransmission may be spaced across 16 slots. From HARQ 0, MAC TB 0, RV 0 to the last RV of the HARQ there may be 64 slots before a HARQ 1, MAC TB 1, RV 0 is received by the UE. Based on the forced ACK approach of the diagram 650 where, for example, RV 2 may be received but cannot be decoded, the UE may transmit the forced ACK for transitioning to MAC TB 1 without further delay caused by retransmission of the remaining RVs for MAC TB 0. In this manner, the spacing may be reduced from 64 slots to 32 slots.

In the foregoing example, the reduction from 64 slots to 32 slots is based on full scheduling, where the UE may receive resources from the base station in 100 percent of the available slots. However, a more practical peak rate may occur at around 10 percent scheduling, where one-tenth of the total resources from the base station may be allocated to the UE at a given time. For 10 percent time division multiplex (TDM) scheduling, 640 slots may be used (e.g., without the forced ACK) before the MAC TB 1 is received by the UE. Continuing with the example, the forced ACK may reduce the spacing from 640 slots to 320 slots. A 320 ms duration corresponding to the 320 slot reduction may be a sufficient time period for 3 retransmissions. When such reductions in the number of slots occurs with respect to multiple HARQs, multiple physical layer resources may be conserved instead of wasted on retransmissions that cannot be decoded by the UE, thereby reducing latency based on the incoming data being received more rapidly by the UE.

Figure 7:
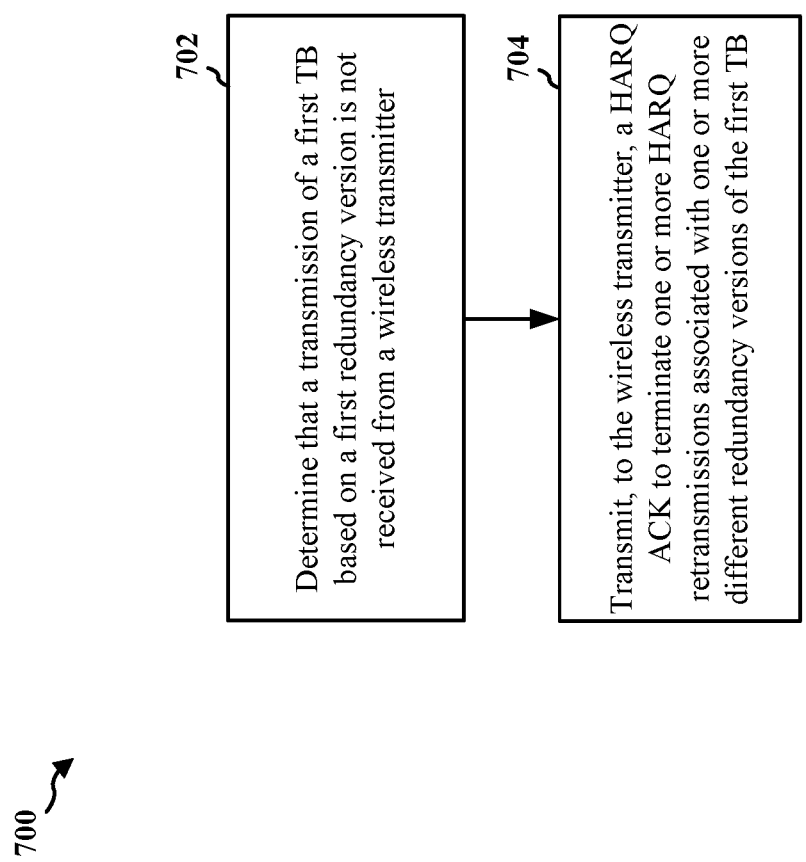
FIG. 7 is a flowchart of a method of wireless communication at a wireless receiver.

FIG. 7 is a flowchart 700 of a method of wireless communication. The method may be performed by a wireless receiver (e.g., UE 104, wireless receiver 402, base station 102, wireless transmitter 404, apparatus 902, apparatus 1002, etc.). In aspects where the wireless receiver is a UE, the wireless receiver may include the memory 360, which may be the entire wireless receiver or a component of the wireless receiver, such as the TX processor 368, the RX processor 356, and/or the controller/processor 359. In aspects where the wireless receiver is a base station, the wireless receiver may include the memory 376, which may be the entire wireless receiver or a component of the wireless receiver, such as the TX processor 316, the RX processor 370, and/or the controller/processor 375.

At 702, the wireless receiver may determine that a transmission of a first TB based on a first redundancy version is not received from a wireless transmitter. For example, referring to FIGS. 4 and 6, the first redundancy version may be RV 0. The diagrams 600-650 indicate that RV 0 for HARQ DL, MAC TB 0 is not received by the wireless receiver (e.g., based on a determination that RV 2, which is to succeed a reception of RV 0, was received from the wireless transmitter unexpectedly). The diagram 400 similarly illustrates that the wireless receiver 402 determines, at 412, that RV 0 is lost based on an unexpected reception of RV 2 from the wireless transmitter 404. The determination, at 702, may be performed, e.g., by the determination components 940/1040 of the apparatuses 902/1002.

At 704, the wireless receiver may transmit, to the wireless transmitter, a HARQ ACK to terminate one or more HARQ retransmissions associated with one or more different redundancy versions of the first TB. For example, referring to FIGS. 4 and 6, the forced ACK indicated via the diagram 650 may be transmitted to the wireless transmitter to terminate RV 3 and RV 1 of MAC TB 0. The diagram 400 similarly illustrates that the wireless receiver 402 may transmit, at 416, a forced ACK to the wireless transmitter 404 to terminate, at 418, one or more HARQ retransmissions. The transmission, at 704, may be performed, e.g., by the transmission components 934/1034 of the apparatuses 902/1002.

Figure 8:
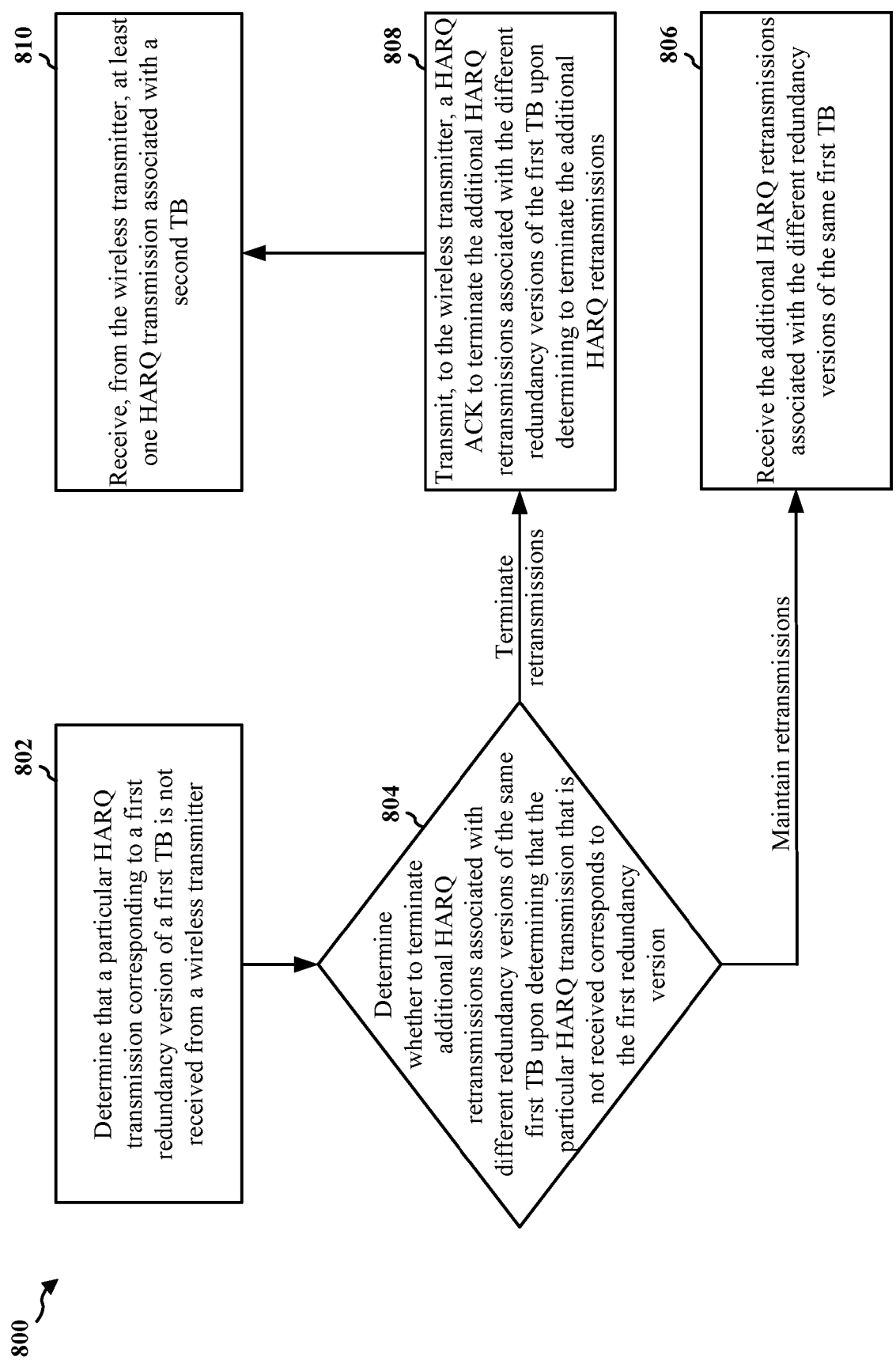
FIG. 8 is a flowchart of a method of wireless communication at a wireless receiver.

FIG. 8 is a flowchart 800 of a method of wireless communication. The method may be performed by a wireless receiver (e.g., UE 104, wireless receiver 402, base station 102, wireless transmitter 404, apparatus 902, apparatus 1002, etc.). In aspects where the wireless receiver is a UE, the wireless receiver may include the memory 360, which may be the entire wireless receiver or a component of the wireless receiver, such as the TX processor 368, the RX processor 356, and/or the controller/processor 359. In aspects where the wireless receiver is a base station, the wireless receiver may include the memory 376, which may be the entire wireless receiver or a component of the wireless receiver, such as the TX processor 316, the RX processor 370, and/or the controller/processor 375.

At 802, the wireless receiver may determine that a particular HARQ transmission corresponding to a first redundancy version of a first TB is not received from a wireless transmitter. For example, referring to FIGS. 4 and 6, the first redundancy version may be RV 0. The diagrams 600-650 indicate that RV 0 for HARQ DL, MAC TB 0 is not received by the wireless receiver (e.g., based on a determination that RV 2, which is to succeed a reception of RV 0, was received from the wireless transmitter unexpectedly). The diagram 400 similarly illustrates that the wireless receiver 402 determines, at 412, that RV 0 is lost based on an unexpected reception of RV 2 from the wireless transmitter 404. The determination, at 802, may be performed, e.g., by the determination components 940/1040 of the apparatuses 902/1002.

At 804, the wireless receiver may determine whether to terminate additional HARQ retransmissions associated with different redundancy versions of the same first TB upon determining that the particular HARQ transmission that is not received corresponds to the first redundancy version. For example, referring to FIGS. 4-6, the wireless receiver may determine whether to terminate RV 3 and RV 1 of HARQ DL, MAC TB 0 included in the diagram 600 upon determining that RV 0 is not received (e.g., based on the unexpected reception of RV 2). The diagram 400 similarly illustrates that the wireless receiver 402 determines, at 414, to terminate retransmissions associated with remaining RVs of the MAC TB. The wireless receiver 402 may determine to terminate/transmit the ACK to terminate the additional HARQ retransmissions (e.g., RV 3 and RV 1) based on at least one of a determination that a number of systematic bits (e.g., systematic bits 502) were lost from the particular HARQ transmission (e.g., RV 0), the number being greater than a systematic bit threshold, a coding rate associated with the particular HARQ transmission (e.g., RV 0) being greater than a coding rate threshold, a number of HARQ processes (e.g., HARQs 0-15) being greater than a HARQ process threshold, or a scheduling latency being greater than a scheduling latency threshold. In further aspects, the wireless receiver may determine to terminate/transmit the ACK to terminate the additional HARQ retransmissions (e.g., RV 3 and RV 1) when the additional HARQ retransmissions (e.g., RV 3 and RV 1) indicate a reserved MCS of a lost HARQ transmission (e.g., RV 0) where the MCS is indicated. The determination, at 804, may be performed, e.g., by the determination components 940/1040 of the apparatuses 902/1002.

At 806, the wireless receiver may receive the additional HARQ retransmissions associated with the different redundancy versions (e.g., RV 3 and RV 1) of the same first TB (e.g., MAC TB 0) upon determining not to terminate the additional HARQ retransmissions/maintain the additional HARQ retransmissions associated with the different redundancy versions (e.g., RV 3 and RV 1) of the same first TB (e.g., MAC TB 0) based on the particular HARQ transmission that is not received corresponding to the first redundancy version (e.g., RV 0). The reception, at 806, may be performed, e.g., by the HARQ retransmission component 942/1042 via the reception components 930/1030 of the apparatuses 902/1002.

At 808, the wireless receiver may transmit, to the wireless transmitter, a HARQ ACK to terminate the additional HARQ retransmissions associated with the different redundancy versions of the first TB upon determining to terminate the additional HARQ retransmissions. For example, referring to FIGS. 4 and 6, the forced ACK indicated via the diagram 650 may be transmitted to the wireless transmitter to terminate RV 3 and RV 1 of MAC TB 0. The diagram 400 similarly illustrates that the wireless receiver 402 may transmit, at 416, a forced ACK to the wireless transmitter 404 to terminate, at 418, one or more HARQ retransmissions. In a first configuration, the wireless receiver 402 may be a UE and the wireless transmitter 404 may be a base station. In a second configuration, the wireless receiver 402 may be a base station and the wireless transmitter 404 may be a UE. The transmission, at 808, may be performed, e.g., by the ACK/NACK component 944/1044 via the transmission components 934/1034 of the apparatuses 902/1002.

At 810, the wireless receiver may receive, from the wireless transmitter, at least one HARQ transmission associated with a second TB. For example, referring to FIGS. 4 and 6, a second TB (e.g., MAC TB 1) associated with a second HARQ transmission (e.g., HARQ 1) may be received from the wireless transmitter. The diagram 400 similarly illustrates that the wireless receiver 402 may receive, at 420, a RV 0 for a next MAC TB. The reception, at 810, may be performed, e.g., by the reception components 930/1030 of the apparatuses 902/1002.

Figure 9:
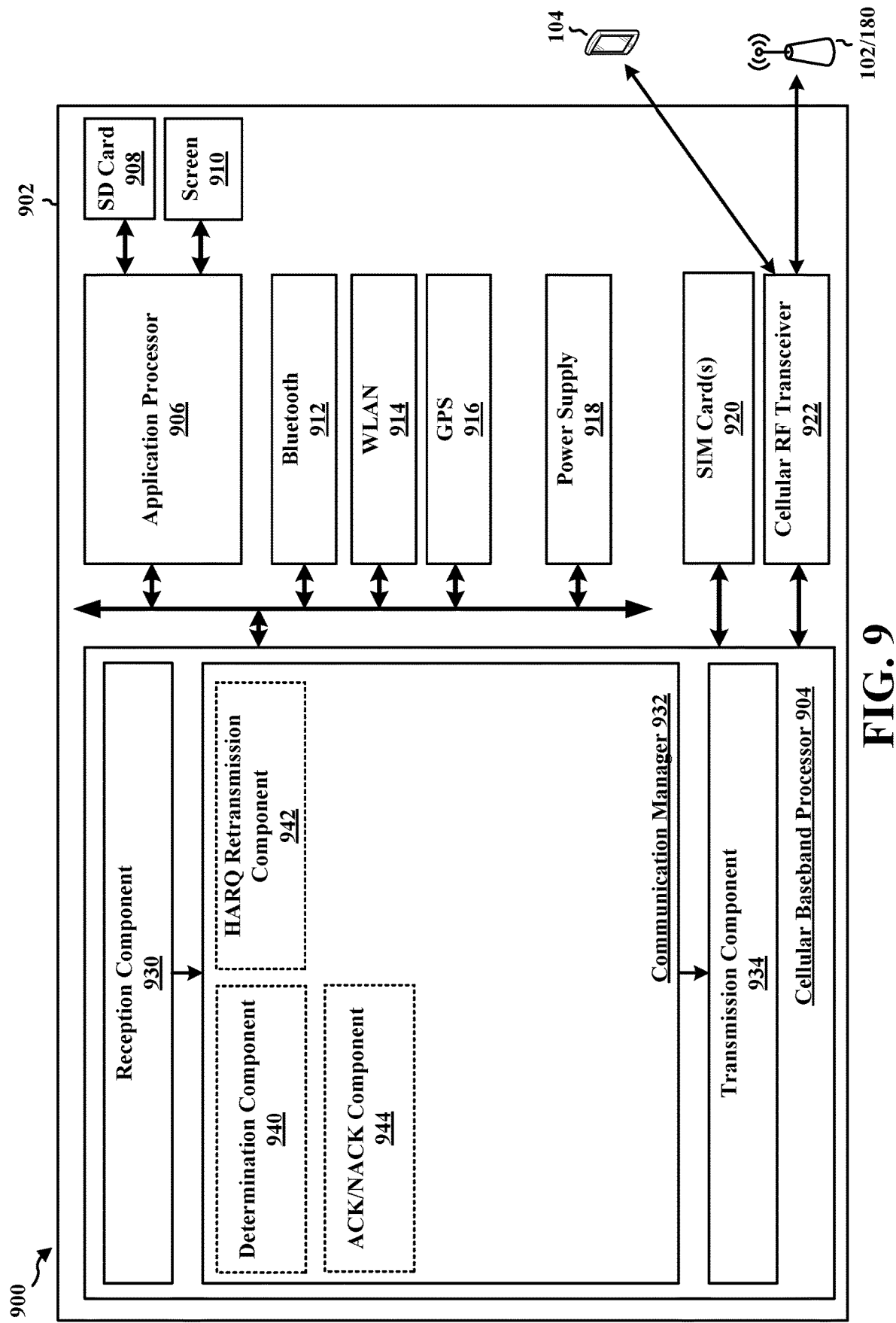
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory.

The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The HARQ retransmission component 942 is configured to receive, via the reception component 930, additional HARQ retransmissions associated with the different redundancy versions of the same first TB, e.g., as described in connection with 806 in FIG. 8. The reception component 930 is configured, e.g., as described in connection with 810, to receive, from the wireless transmitter, at least one HARQ transmission associated with a second TB. The ACK/NACK component 944 is configured to transmit, via the transmission component 934, to the wireless transmitter, a HARQ ACK to terminate one or more HARQ retransmissions associated with one or more different redundancy versions of the first TB; and to transmit, to the wireless transmitter, a HARQ ACK to terminate the additional HARQ retransmissions associated with the different redundancy versions of the first TB upon determining to terminate the additional HARQ retransmissions, e.g., as described in connection with 704 and/or 808.

The communication manager 932 includes a determination component 940 that is configured, e.g., as described in connection with 702, 802, and 804, to determine that a transmission of a first TB based on a first redundancy version is not received from a wireless transmitter; to determine that a particular HARQ transmission corresponding to a first redundancy version of a first TB is not received from a wireless transmitter; and to determine whether to terminate additional HARQ retransmissions associated with different redundancy versions of the same first TB upon determining that the particular HARQ transmission that is not received corresponds to the first redundancy version.

The apparatus may include additional components that perform each of the blocks of the algorithm in the flowcharts of FIGS. 7-8. As such, each block in the flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for determining that a transmission of a first TB based on a first redundancy version is not received from a wireless transmitter; and means for transmitting, to the wireless transmitter, a HARQ ACK to terminate one or more HARQ retransmissions associated with one or more different redundancy versions of the first TB. The apparatus 902 may further include means for receiving, from the wireless transmitter, at least one HARQ transmission associated with a second TB.

The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
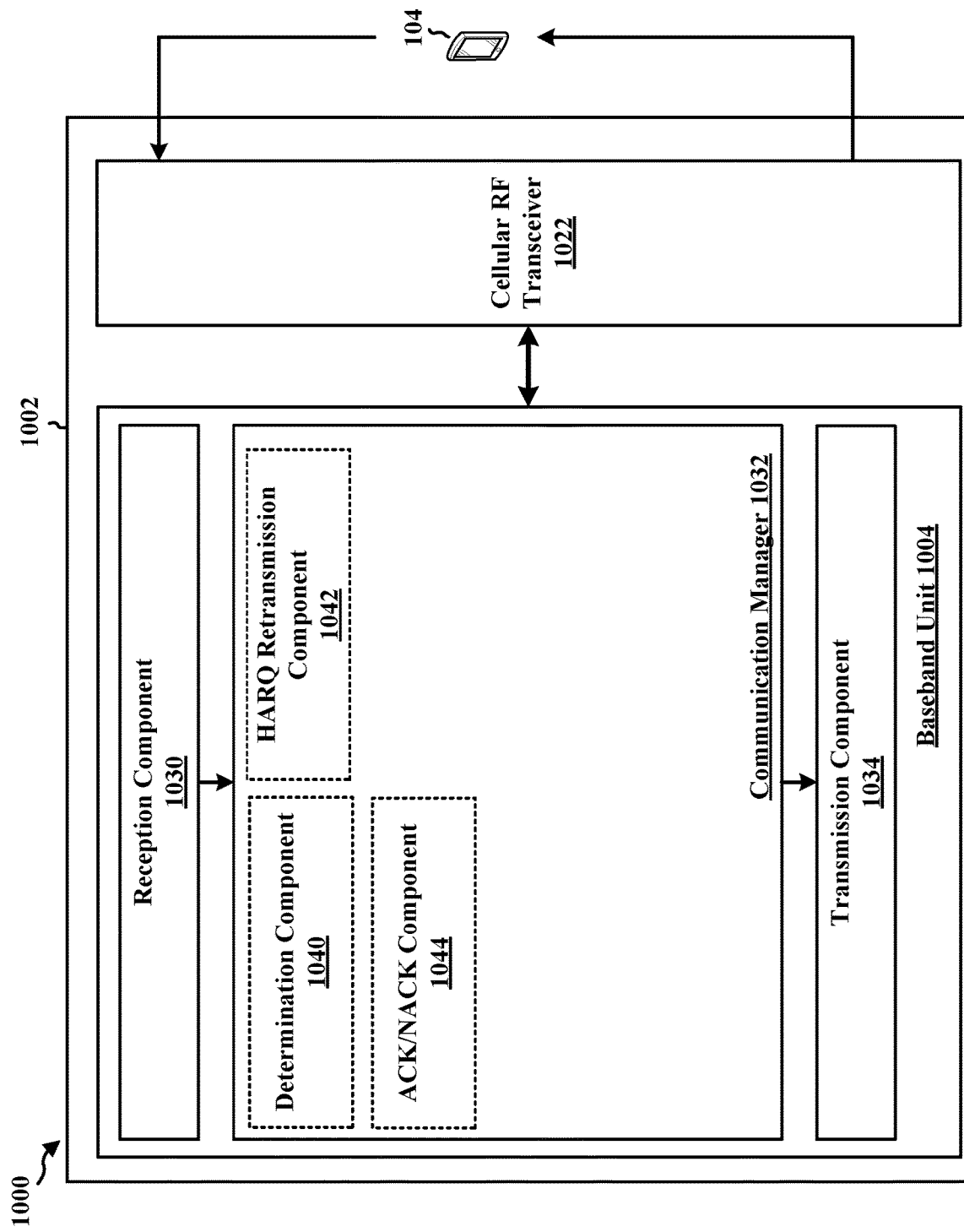
FIG. 10 is a diagram illustrating an example of a hardware implementation for an example apparatus.

FIG. 10 is a diagram 1000 illustrating an example of a hardware implementation for an apparatus 1002. The apparatus 1002 may be a base station, a component of a base station, or may implement base station functionality. In some aspects, the apparatus 902 may include a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The HARQ retransmission component 1042 is configured to receive, via the reception component 1030, additional HARQ retransmissions associated with the different redundancy versions of the same first TB, e.g., as described in connection with 806 in FIG. 8. The reception component 930 is configured, e.g., as described in connection with 810, to receive, from the wireless transmitter, at least one HARQ transmission associated with a second TB. The ACK/NACK component 1044 is configured to transmit, via the transmission component 1034, to the wireless transmitter, a HARQ ACK to terminate one or more HARQ retransmissions associated with one or more different redundancy versions of the first TB; and to transmit, to the wireless transmitter, a HARQ ACK to terminate the additional HARQ retransmissions associated with the different redundancy versions of the first TB upon determining to terminate the additional HARQ retransmissions, e.g., as described in connection with 704 and/or 808.

The communication manager 1032 includes a determination component 1040 that is configured, e.g., as described in connection with 702, 802, and 804, to determine that a transmission of a first TB based on a first redundancy version is not received from a wireless transmitter; to determine that a particular HARQ transmission corresponding to a first redundancy version of a first TB is not received from a wireless transmitter; and to determine whether to terminate additional HARQ retransmissions associated with different redundancy versions of the same first TB upon determining that the particular HARQ transmission that is not received corresponds to the first redundancy version.

The apparatus may include additional components that perform each of the blocks of the algorithm in the flowcharts of FIGS. 7-8. As such, each block in the flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for determining that a transmission of a first TB based on a first redundancy version is not received from a wireless transmitter; and means for transmitting, to the wireless transmitter, a HARQ ACK to terminate one or more HARQ retransmissions associated with one or more different redundancy versions of the first TB. The apparatus 1002 may further include means for receiving, from the wireless transmitter, at least one HARQ transmission associated with a second TB.

The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

Accordingly, the wireless receiver may be configured to transmit, to a wireless transmitter, a HARQ ACK when a HARQ transmission/retransmission is successfully received and decoded by the wireless receiver, and transmit a NACK when the HARQ transmission/retransmission is not successfully received and decoded by the wireless receiver. If the wireless transmitter does not receive an ACK or a NACK from the wireless receiver, the wireless transmitter may determine that DTX has occurred and proceed with retransmission of a next redundancy version (e.g., RV 2). Hence, if the wireless receiver is expecting to receive RV 0, but RV 0 is lost/not received, the wireless receiver may unexpectedly receive RV 2. An unexpected reception of RV 2 may indicate to the wireless receiver that RV 0 was lost, which may thereby cause the wireless receiver to transmit a forced ACK to the wireless transmitter. The forced ACK may terminate additional HARQ retransmissions associated with the remaining different redundancy versions of the TB to reduce wasted resources that may result from the wireless receiver not being able to decode the additional HARQ retransmissions associated with the remaining different redundancy versions of the TB.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a wireless receiver including at least one processor coupled to a memory and configured to determine that a transmission of a first TB based on a first redundancy version is not received from a wireless transmitter; and transmit, to the wireless transmitter, a HARQ ACK to terminate one or more HARQ retransmissions associated with one or more different redundancy versions of the first TB.

Aspect 2 may be combined with aspect 1 and includes that the wireless receiver transmits the ACK to terminate the one or more HARQ retransmissions when the one or more HARQ retransmissions indicate a reserved MCS of a lost HARQ transmission where the MCS is indicated.

Aspect 3 may be combined with any of aspects 1-2 and includes that the wireless receiver transmits the ACK to terminate the one or more HARQ retransmissions based on a determination that a number of systematic bits were lost from a HARQ transmission, the number being greater than a threshold.

Aspect 4 may be combined with any of aspects 1-3 and includes that the wireless receiver transmits the ACK to terminate the one or more HARQ retransmissions based on a coding rate associated with a HARQ transmission being greater than a threshold.

Aspect 5 may be combined with any of aspects 1-4 and includes that the wireless receiver transmits the ACK to terminate the one or more HARQ retransmissions based on a number of HARQ processes being greater than a threshold.

Aspect 6 may be combined with any of aspects 1-5 and includes that the wireless receiver transmits the ACK to terminate the one or more HARQ retransmissions based on a scheduling latency being greater than a threshold.

Aspect 7 may be combined with any of aspects 1-6 and includes that the at least one processor is further configured to receive, from the wireless transmitter, at least one HARQ transmission associated with a second TB.

Aspect 8 may be combined with any of aspects 1-7 and includes that the first redundancy version is RV 0.

Aspect 9 may be combined with any of aspects 1-8 and includes that the wireless receiver is a UE and the wireless transmitter is a base station.

Aspect 10 may be combined with any of aspects 1-8 and includes that the wireless receiver is a base station and the wireless transmitter is a UE.

Aspect 11 is a method of wireless communication for implementing any of aspects 1-10.

Aspect 12 is an apparatus for wireless communication including means for implementing any of aspects 1-10.

Aspect 13 is a computer-readable medium storing computer executable code, the code when executed by at least one processor causes the at least one processor to implement any of aspects 1-10.

What is claimed is:

1. An apparatus for wireless communication at a wireless receiver, comprising:
   memory; and
   at least one processor coupled to the memory and configured to:
      determine that a transmission of redundancy version zero (RV 0) associated with a first transport block (TB) is not received from a wireless transmitter; and
      transmit a hybrid automatic repeat request (HARQ) acknowledgment (ACK) to the wireless transmitter based upon the determination that the transmission of the RV 0 is not received from the wireless transmitter.

2. The apparatus of claim 1, wherein the HARQ ACK indicates that one or more HARQ retransmissions associated with one or more different redundancy versions (RVs) of the first TB are to be terminated.

3. The apparatus of claim 1, wherein to determine that the transmission of the RV 0 associated with the first TB is not received from the wireless transmitter, the at least one processor is configured to determine that a number of lost systematic bits associated with the RV 0 is greater than a systematic bit threshold.

4. The apparatus of claim 1, wherein to transmit the HARQ ACK to the wireless transmitter based upon the determination that the transmission of the RV 0 is not received from the wireless transmitter, the at least one processor is configured to transmit the HARQ ACK to the wireless transmitter further based on one or more HARQ retransmissions that indicate a reserved modulation and coding scheme (MCS) of a lost HARQ retransmission.

5. The apparatus of claim 1, wherein to determine that the transmission of the RV 0 associated with the first TB is not received from the wireless transmitter, the at least one processor is configured to determine that a coding rate associated with the RV 0 is greater than a coding rate threshold.

6. The apparatus of claim 1, wherein to determine that the transmission of the RV 0 associated with the first TB is not received from the wireless transmitter, the at least one processor is configured to determine that a number of HARQ processes is greater than a HARQ process threshold.

7. The apparatus of claim 1, wherein to determine that the transmission of the RV 0 associated with the first TB is not received from the wireless transmitter, the at least one processor is configured to determine that a scheduling latency is greater than a scheduling latency threshold.

8. The apparatus of claim 1, wherein the at least one processor is further configured to:
 determine that a first transmission of a first RV 0 associated with a second TB is received from the wireless transmitter; and
 decode remaining redundancy versions (RVs) associated with the second TB based upon the determination that the first transmission of the first RV 0 is received from the wireless transmitter.

9. The apparatus of claim 8, wherein to determine that the first transmission of the first RV 0 associated with the second TB is received from the wireless transmitter, the at least one processor is configured to determine that a number of lost systematic bits associated with the first RV 0 is less than a systematic bit threshold, determine that a coding rate associated with the first RV 0 is less than a coding rate threshold, determine that a number of HARQ processes is less than a HARQ process threshold, or determine that a scheduling latency is less than a scheduling latency threshold.

10. The apparatus of claim 1, wherein the at least one processor is further configured to:
 receive, from the wireless transmitter, at least one HARQ transmission associated with a second TB based on the transmitted HARQ ACK.

11. The apparatus of claim 1, wherein the at least one processor is further configured to:
 receive, via downlink control information (DCI), information that indicates at least one of a modulation and coding scheme (MCS) or a redundancy version (RV) instance, wherein to determine that the transmission of the RV 0 is not received from the wireless transmitter, the at least one processor is configured to determine that the transmission of the RV 0 is not received from the wireless transmitter based on the information.

12. The apparatus of claim 1, wherein to determine that the transmission of the RV 0 is not received from the wireless transmitter, the at least one processor is configured to determine that remaining redundancy versions (RVs) are unable to be decoded as a result of non-received information associated with the RV 0.

13. The apparatus of claim 1, wherein the wireless receiver is a user equipment (UE) and the wireless transmitter is a base station (BS).

14. The apparatus of claim 1, wherein the wireless receiver is a base station (BS) and the wireless transmitter is a user equipment (UE).

15. The apparatus of claim 1, further comprising at least one of a transceiver or antenna coupled to the at least one processor.

16. A method of wireless communication at a wireless receiver, comprising:
 determining that a transmission of redundancy version zero (RV 0) associated with a first transport block (TB) is not received from a wireless transmitter; and
 transmitting a hybrid automatic repeat request (HARQ) acknowledgment (ACK) to the wireless transmitter based upon the determination that the transmission of the RV 0 is not received from the wireless transmitter.

17. The method of claim 16, wherein the HARQ ACK indicates that one or more HARQ retransmissions associated with one or more different redundancy versions (RVs) of the first TB are to be terminated.

18. The method of claim 16, wherein determining that the transmission of the RV 0 associated with the first TB is not received from the wireless transmitter comprises determining that a number of lost systematic bits associated with the RV 0 is greater than a systematic bit threshold.

19. The method of claim 16, wherein transmitting the HARQ ACK to the wireless transmitter based upon the determination that the transmission of the RV 0 is not received from the wireless transmitter comprises transmitting the HARQ ACK to the wireless transmitter further based on one or more HARQ retransmissions that indicate a reserved modulation and coding scheme (MCS) of a lost HARQ retransmission.

20. An apparatus for wireless communication at a wireless receiver, comprising:
 means for determining that a transmission of redundancy version zero (RV 0) associated with a first transport block (TB) is not received from a wireless transmitter; and
 means for transmitting a hybrid automatic repeat request (HARQ) acknowledgment (ACK) to the wireless transmitter based upon the determination that the transmission of the RV 0 is not received from the wireless transmitter.

* * * * *